Oct. 9, 1934.    E. V. TAYLOR    1,976,419
BRAKE
Filed Dec. 7, 1928    2 Sheets-Sheet 1

INVENTOR.
Eugene V. Taylor
BY H. O. Clayton
ATTORNEY

Oct. 9, 1934.  E. V. TAYLOR  1,976,419
BRAKE
Filed Dec. 7, 1928   2 Sheets-Sheet 2

INVENTOR.
Eugene V. Taylor
BY H. O. Clayton
ATTORNEY

Patented Oct. 9, 1934

1,976,419

UNITED STATES PATENT OFFICE

1,976,419

BRAKE

Eugene V. Taylor, Chicago, Ill., assignor to Bendix Brake Company, South Bend, Ind., a corporation of Illinois Application December 7, 1928, Serial No. 324,339

17 Claims. (Cl. 188—78)

This invention relates to brakes, and is illustrated as embodied in an internal expanding brake for an automobile.

One object of the invention is to provide a powerful but simple brake in which the friction means of the brake comprises a plurality of flexible brake shoes inherently possessing, in combination with the revolving drum, the quality of self energization. The frictional retarding force of any braking element in drum contact is a function of its area of contact or effective length of the element insofar as the self energization of the element is concerned. In other words the greater the length the greater the self energization and the greater the retarding force which is the desideratum.

Now the flexible shoe, by virtue of its flexibility, readily conforms to the drum contour and hence increases the area of contact but has at the same time, the disadvantage of being difficult to apply or control. Furthermore because of its flexibility it is liable to warp in limited areas of lesser strength resulting in high pressure areas with the inevitable highly undesirable and dangerous locking or grabbing. Now I propose to obviate this difficulty of control and secure uniform and full application of the flexible shoe by the employment of a novel cam or actuating structure comprising the conventional crank cam or the like, together with a supplemental camming lever synchronized in its movement with the aforementioned cam, the two operated from a common shaft.

In the embodiment illustrated I propose to provide at least two flexible brake elements each separately anchored at one end and forced into drum contact by any novel combined cam crank and cam lever structure at a plurality of points about each element. A full face contact of each element is thus effected and by virtue of the plurality of camming points the tendency to distort and grab is obviated. The virtue of a flexible band is, however, retained in large measure.

Further features of novelty relate to an arrangement of the levers for effecting the supplemental applying action in lieu of the preferred single lever; to means for relative adjustment of the operating cams; to a spring pressed cam roller; to the particular cam structure on the common shaft for actuating both shoe and lever; to a fulcrum adjustment for the lever, and to various other features of construction and combinations of parts which will be apparent from the following description of one illustrative embodiment shown in the accompanying drawings, in which.

Figure 4:
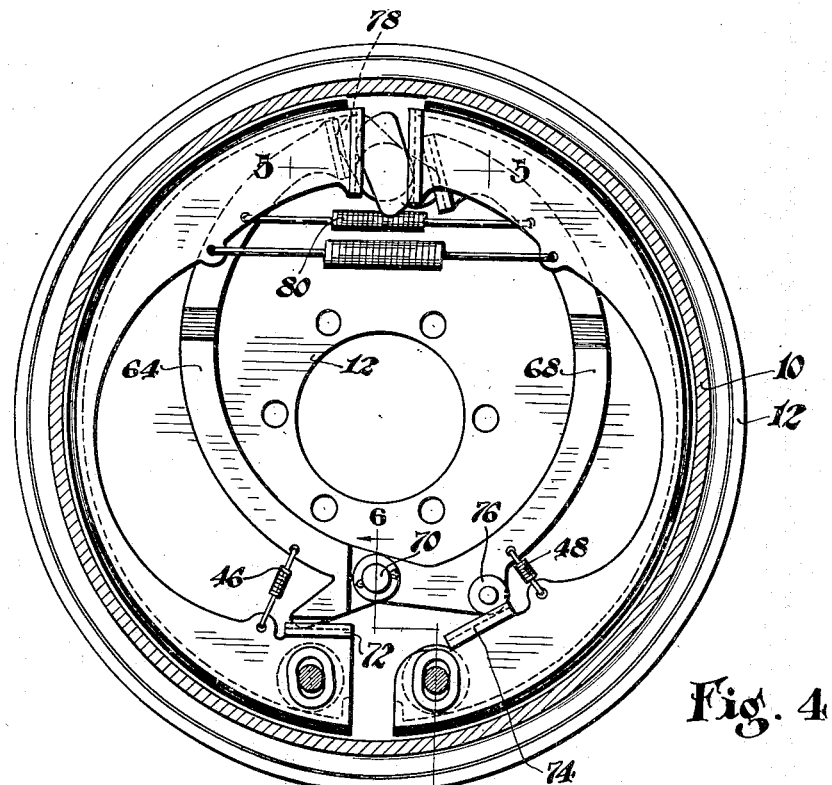
Figure 4 is a section similar to Figure 1 showing a modified form of brake.
Figure 5:
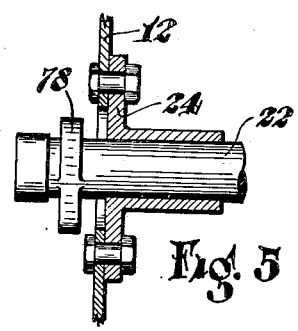
Figure 8:
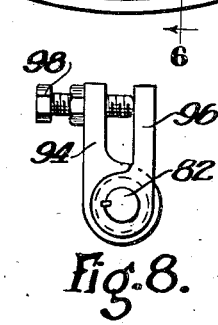
Figure 6:
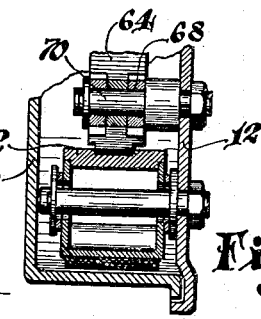
Figure 7:
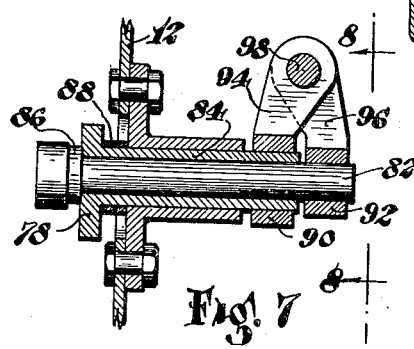

Figures 5 and 6 are views similar to 2 and 3 taken on the lines 5—5 and 6—6 of Figure 4;

Figure 7 is a section indicating one means of securing relative adjustment between the two crank cams of the brake; and Figure 8 is a partial elevation, looking in the direction of the arrows 8—8 in Figure 7, and showing an adjustment for the cam shaft.

Figure 1:
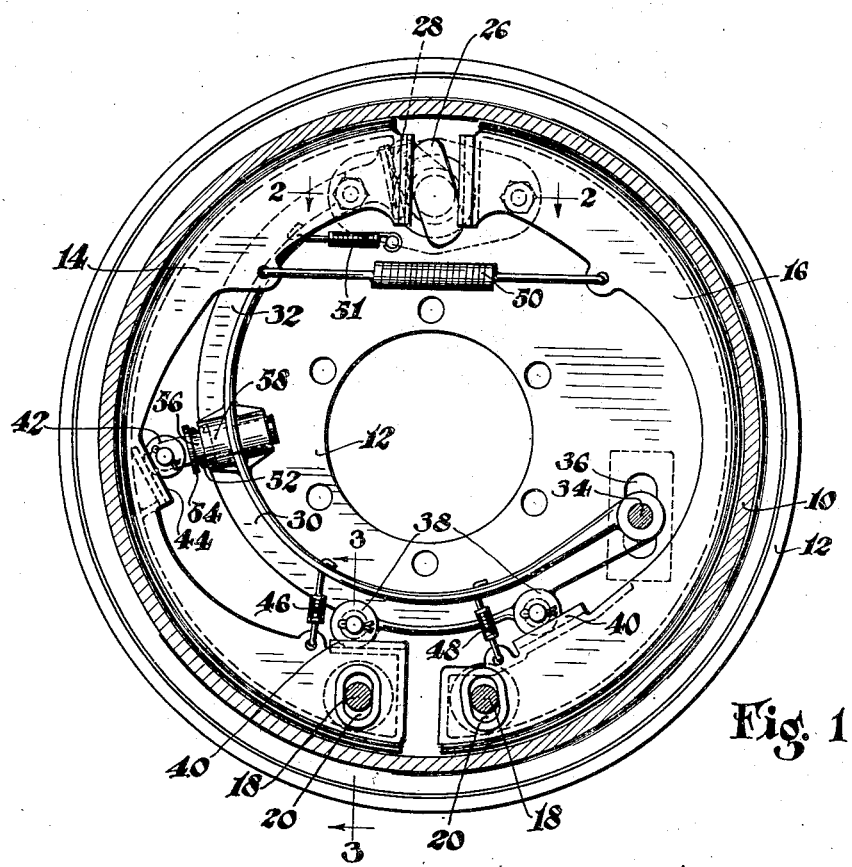
Figure 1 is a vertical section of the brake, just inside the head of the brake drum, showing the friction means of the brake in side elevation.
Figure 2:
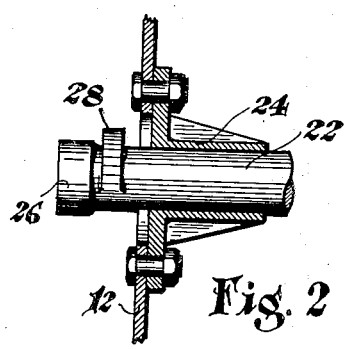
Figure 2 is a section taken on the line 2—2 of Figure 1 showing a portion of the cam structure.
Figure 3:
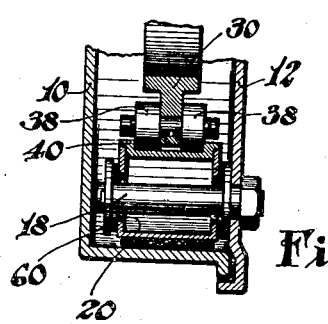
Figure 3 is a section on the line 3—3 of Figure 1 disclosing the shoe and lever structure in section.

In the embodiment illustrated in Figures 1, 2, and 3, I provide the usual rotatable drum 10, at the open side of which is a stationary support such as a backing plate 12. Within the drum is arranged the novel friction means of the brake, shown as comprising two substantially flexible channel-sectioned shoes 14 and 16 made so by virtue of their relatively shallow webs further characterized by being progressively tapered from the center of the shoe to the ends thus increasing the flexibility at the center. The shoes are preferably arranged end to end to act on the same zone of the drum and are further preferably each anchored at one pair of juxtaposed ends by pins 18, rigid with the backing plate, and passing through radial slots 20 in the shoe ends.

According to an important feature of my invention, I provide an applying means for the flexible shoes, which means is so designed as to render the shoes quite controllable by effectively applying and retaining the same in full drum contact. The applying means preferably includes a cam rock shaft 22 journaled in a bearing 24, suitably secured to the backing plate and provided with a two lobe cam 26 and a single lobe cam 28 adjacent thereto. Each lobe of the cam 26 functions as a crank to apply the respective spaced ends of the brake shoe friction means and the single lobe cam or crank 28 serves to actuate the supplemental brake applying lever 30. Lever 30 is preferably of T-section formation, the major portion of the web thereof lying in the same plane as the web of the shoe 14, the remaining portion being bent at 32 to avoid the shoe web and thence continued to its applying end parallel with the shoe.

The lever is preferably adjustably fulcrumed by a pivot pin 34 mounted for movement within a slot 36 in the backing plate and secured in position by a lock nut (not shown). Anti-friction rollers 38 suitably mounted in the web of the lever engage recessed transversely extending thrust plates 40 one secured between the sides of each of shoes 14 and 16 above the anchor pins therein. A novel spring-pressed roller 42 is preferably mounted in the web of the lever for engagement with an inclined flat plate 44 secured between the sides of shoe 14 intermediate its ends. Suitable return springs 46 and 48 serve to retain the shoes in engagement with the rollers 38 functioning as stops to determine the idle position of the brake, and springs 50 and 51 serve to maintain the shoe ends and lever end, respectively, in contact with the cams 26 and 28. The compression spring 52 of the roller 42 interposed between a flange 54 on the plunger 56 and the housing 58 therefore serves to maintain the lever 30 in contact with its cam 28. Washers 60 on the anchor pins 18 together with suitable recesses in the thrust plates serve to confine the shoes against lateral movement.

In operation rotary movement of the cam shaft 22, effected by suitable linkage connected with the service pedal, functions through the intermediary of the cams 26 and 28, to simultaneously apply pressure to both the heel and toe of each shoe. Shoe 14 is further actuated by the spring pressed roller 42, the degree of movement of the lever to effect the pressure at this point being proportional to the degree of pressure applied to the shoe, this by virtue of the function of the compression spring 52. Shoe 14 is thus applied at three different points and shoe 16 at two points insuring complete application and control of the flexible shoes resulting in a high degree of self energization by virtue of the full drum contact.

In Figures 4, 5 and 6 there is disclosed a modified form of applying means including two supplemental bell crank levers 64 and 68 having a common pivot and fulcrum point 70, the short arm of each lever contacting flats 72 and 74 on the respective shoes. Anti-friction rollers 76 may be provided at said contact points to insure effective application of the lever.

A two lobe cam 78 is provided to apply both levers and a tension spring 80 connected to both levers retains the same at all times in cam contact. In all other respects the brake structure is the same as that previously described.

As disclosed in Figure 7 relative adjustment of the cams, to secure the desired synchronized applying pressures, may be effected by providing each cam with telescoping separated shafts 82 and 84, cam 78 being confined between an abutment 86 on shaft 82 and the bearing by a spaced sleeve 88. A collar 90 suitably keyed on shaft 84 and a sleeve 92 on shaft 82 are both provided with juxtaposed ears 94 and 96 respectively, one or the other of which may be provided with an adjusting screw 98 threaded therein, the end to contact the other ear to effect the desired adjustment.

While but two embodiments of my invention have been illustrated in detail, it is not my intention to be unnecessarily restricted thereby but only so far as may be determined by the scope of the appended claims.

I claim:

1. Operating means for a brake friction element comprising a lever provided with rollers, one of said rollers being spring pressed.

2. A brake comprising a flexible brake shoe applied by a single lever acting at spaced points about the inner face of said shoe, and a spring through which the lever acts on the shoe at one of said spaced points.

3. A brake comprising a friction element, a lever engaging the friction element, and means directly engaging and applying force to one end of the lever and to one end of the shoe simultaneously, said ends of the lever and shoe being arranged side by side.

4. A brake comprising a friction element anchored at one end, a lever pivoted at one end and adapted to engage the friction element at spaced points and an operating member adapted to act upon the free ends of the friction element and the lever simultaneously.

5. A brake comprising friction elements arranged end to end, a pivoted member engaging the friction elements at spaced points and bridging across the adjacent ends of said elements and engaging both of them, and operating means for the friction elements including means for actuating the pivotal member and engaging the end of the pivoted member adjacent the opposite ends of said elements from the ends bridged by said member.

6. A brake comprising friction elements arranged end to end, anchors for adjacent ends of the friction elements, a pivotal member engaging the friction elements at spaced intervals and an operating member acting on the free ends of the friction elements and pivotal member simultaneously to spread the friction elements and to transmit force to the pivotal member.

7. A brake comprising a friction means, a lever for operating the friction means and a separate means including a pair of cams for actuating said friction means and lever respectively.

8. A brake comprising a pair of brake shoes having radially-floating anchored ends, applying means for the unanchored adjacent ends, and a lever actuated by the applying means acting to shift the anchored pair of ends of said shoes radially.

9. A brake comprising a pair of brake shoes having pairs of disconnected adjacent ends, applying means for spreading one pair of ends, anchors engaged by the other pair of ends and with respect to which said other pair of ends can float radially, and means operated by the applying means for moving said anchored other pair of ends radially.

10. A brake comprising a drum, a flexible brake shoe, and a relatively stationary support, anchor means for one end of said shoe providing for radial movement of said end, a cam and shaft mounted in said support and adjacent the other end of said shoe for actuation thereof, and a second cam on said shaft, a lever pivoted on said support at a point distant from said shaft, and engaging said second cam, and means on said lever for engaging the anchor end of said shoe to apply the said shoe upon actuation of said shaft.

11. A brake having a pair of shoes, and a pivoted lever acting on one shoe adjacent its end and bridging across the space between the shoes and acting on the other shoe at a plurality of spaced points.

12. A brake comprising a lever having a plurality of shoe-engaging rollers, one of which is spring-pressed.

13. A brake comprising a lever having a spring-pressed shoe-engaging roller.

14. A brake comprising a drum, a plurality of individually anchored flexible brake elements, a lever bridging across the anchored ends of said elements and engaging both of them and arranged to apply said elements at spaced points, and operating means for actuating the braking elements and lever.

15. A brake comprising a drum, a fixed abutment associated therewith, a flexible brake element within said drum adapted to anchor on said abutment, a lever arranged to apply pressure to said element, and an applying device engaging both the brake element and said lever and acting simultaneously on said element directly and through said lever.

16. A brake comprising a flexible friction element, an applying means therefor including a direct acting lever having yielding rolling engagement with said element, means for adjusting said lever to vary its fulcrum point, and means for operating said friction element and lever with synchronized movement.

17. A brake comprising a friction element and means for applying said element including a lever and a cam, each acting directly on opposite ends of the element, and a spring pressed member actuated by the lever and acting on said element between its ends.

EUGENE V. TAYLOR.